(12) United States Patent
Zieba et al.

(10) Patent No.: US 12,105,012 B2
(45) Date of Patent: Oct. 1, 2024

(54) METHOD OF DETECTING SURFACE IRREGULARITIES ON OR IN AN INTERNAL SURFACE OF A CYLINDER FOR USE IN A PISTON-CYLINDER ASSEMBLY, AND RELATED APPARATUS

(71) Applicant: XTPL S.A., Wrocław (PL)

(72) Inventors: Szymon Zieba, Wrocław (PL); Maciej Tybel, Wrocław (PL); Filip Granek, Mrozów (PL)

(73) Assignee: XTPL S.A., Wrocław (PL)

( * ) Notice: Subject to any disclaimer, the term of this patent is extended or adjusted under 35 U.S.C. 154(b) by 291 days.

(21) Appl. No.: 17/663,226

(22) Filed: May 13, 2022

(65) Prior Publication Data

US 2022/0364980 A1 Nov. 17, 2022

Related U.S. Application Data

(60) Provisional application No. 63/188,966, filed on May 14, 2021.

(51) Int. Cl.
*G01N 19/02* (2006.01)
*G01N 3/08* (2006.01)

(52) U.S. Cl.
CPC .............. *G01N 19/02* (2013.01); *G01N 3/08* (2013.01)

(58) Field of Classification Search
CPC .................................. G01N 19/02; G01N 3/08
See application file for complete search history.

(56) References Cited

U.S. PATENT DOCUMENTS

| | | | | |
|---|---|---|---|---|
| 2,611,263 | A * | 9/1952 | Justice | G01N 19/02 73/9 |
| 2,679,160 | A * | 5/1954 | Welch | F15B 19/00 73/114.77 |
| 4,949,465 | A * | 8/1990 | Pesikov | B23Q 11/001 33/503 |
| 2002/0083913 | A1* | 7/2002 | Ha | F02B 77/083 123/193.2 |
| 2009/0064804 | A1* | 3/2009 | Memmel | G01B 21/00 73/866.5 |
| 2009/0200126 | A1* | 8/2009 | Kondo | F16F 9/535 29/896.93 |
| 2010/0050864 | A1* | 3/2010 | Morath | B66C 23/80 92/248 |
| 2010/0288222 | A1* | 11/2010 | Urabe | F16J 10/04 123/193.2 |
| 2016/0348611 | A1* | 12/2016 | Suda | F02F 3/10 |
| 2018/0149109 | A1* | 5/2018 | Bischofberger | F02F 1/18 |

* cited by examiner

*Primary Examiner* — Helen C Kwok
(74) *Attorney, Agent, or Firm* — K&L Gates LLP (57) ABSTRACT

In various aspects, a method of detecting surface irregularities on or in an internal surface of a cylinder for use in a piston-cylinder assembly is disclosed. The method can include (A) fixing a position of and an orientation of a first one of the cylinder and a piston; (B) configuring a positioner and a dynamometer to move a dynamometer and a second one of the cylinder and the piston along a common longitudinal axis, the dynamometer being mechanically coupled to the second one; (C) moving the second one relative to the first one along the common longitudinal axis between a first position and a second position, the piston being located inside the cylinder at the first position and at the second position; and (D) measuring, by the dynamometer, a frictional force between the piston and the cylinder during the movement.

20 Claims, 9 Drawing Sheets

METHOD OF DETECTING SURFACE IRREGULARITIES ON OR IN AN INTERNAL SURFACE OF A CYLINDER FOR USE IN A PISTON-CYLINDER ASSEMBLY, AND RELATED APPARATUS

CROSS-REFERENCE TO RELATED APPLICATION

This application claims the benefit of and priority under 35 U.S.C. § 119(e) to U.S. Provisional Application No. 63/188,966, titled METHOD OF DETECTING SURFACE IRREGULARITIES ON OR IN AN INTERNAL SURFACE OF A CYLINDER FOR USE IN A PISTON-CYLINDER ASSEMBLY, AND RELATED APPARATUS, filed May 14, 2021, the disclosure of which is hereby incorporated by reference in its entirety.

BACKGROUND

A piston-cylinder assembly is a critical component in a printing apparatus in which nanoparticle compositions are extruded through a capillary tube. The piston moves in the cylinder under an applied pressure from a regulated pneumatic system. It has been found that when an internal surface of a cylinder has microscopic surface irregularities, there can be irregularities in the extrusion of nanoparticle compositions. Therefore, it would be desirable to test the internal surfaces of cylinders before they are assembled into piston-cylinder assemblies.

SUMMARY

In one aspect, a method of detecting surface irregularities on or in an internal surface of a cylinder for use in a piston-cylinder assembly includes: (A) fixing a position of and orientation of a first one of the cylinder and a piston; (B) configuring a positioner and a dynamometer to move the dynamometer and a second one of the cylinder and the piston along a common longitudinal axis, the dynamometer being mechanically coupled to the second one; (C) moving the second one relative to the first one along the common longitudinal axis between a first position and a second position, the piston being located inside the cylinder at the first position and at the second position; (D) measuring, by the dynamometer, a frictional force between the piston and the cylinder during the movement; and (E) detecting surface irregularities on or in the internal surface of the cylinder in accordance with temporal changes in the frictional force during the movement.

In another aspect, an apparatus for detecting surface irregularities on or in an internal surface of a cylinder for use in a piston-cylinder assembly includes the following: a component support structure configured to fix a position of and orientation of a first one of the cylinder and a piston; a dynamometer; a positioner attached to the dynamometer; and a controller electronically coupled to the dynamometer. The positioner is configured to move the dynamometer and a second one of the cylinder and the piston along a common longitudinal axis between a first position and a second position. The piston is located inside the cylinder at the first position and at the second position. The dynamometer is mechanically coupled to the second one. The dynamometer is configured to measure a frictional force between the cylinder and the piston during the movement. The controller is configured to detect surface irregularities on or in the internal surface of the cylinder in accordance with temporal changes in the frictional force during the movement.

The above summary is not intended to describe each embodiment or every implementation of the present disclosure. The description that follows more particularly exemplifies various illustrative aspects. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various aspects of the disclosure in connection with the accompanying drawings, in which.

Corresponding reference characters indicate corresponding parts throughout the several views. The exemplifications set out herein illustrate various disclosed embodiments, in one form, and such exemplifications are not to be construed as limiting the scope thereof in any manner.

DETAILED DESCRIPTION

The present disclosure relates to a method of detecting surface irregularities on or in an internal surface of a cylinder for use in a piston-cylinder assembly and apparatus for detecting surface irregularities on or in an internal surface of a cylinder for use in a piston-cylinder assembly.

In this disclosure:

The words "preferred" and "preferably" refer to aspects of the disclosure that may afford certain benefits, under certain circumstances. However, other aspects may also be preferred, under the same or other circumstances. Furthermore, the recitation of one or more preferred aspects does not imply that other aspects are not useful and is not intended to exclude other aspects from the scope of the disclosure.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
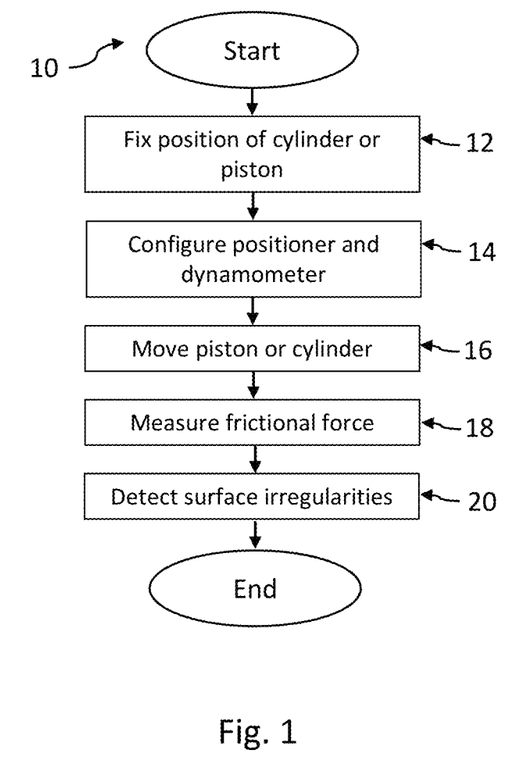
FIG. 1 is a flow diagram of a method of detecting surface irregularities on or in an internal surface of a cylinder for use in a piston-cylinder assembly, according to one aspect of this disclosure.

FIG. 1 is a flow diagram of a method 10 of detecting surface irregularities on or in an internal surface of a cylinder for use in a piston-cylinder assembly. For example, a piston-cylinder assembly is used in a print head of a printing apparatus (printer). For example, the printing apparatus is used for extruding metallic nanoparticle compositions (paste) or for dispensing polymer solutions. A piston-cylinder includes a cylinder and a piston, with the piston and the cylinder movable relative to each other along a common longitudinal axis.

Figure 2:
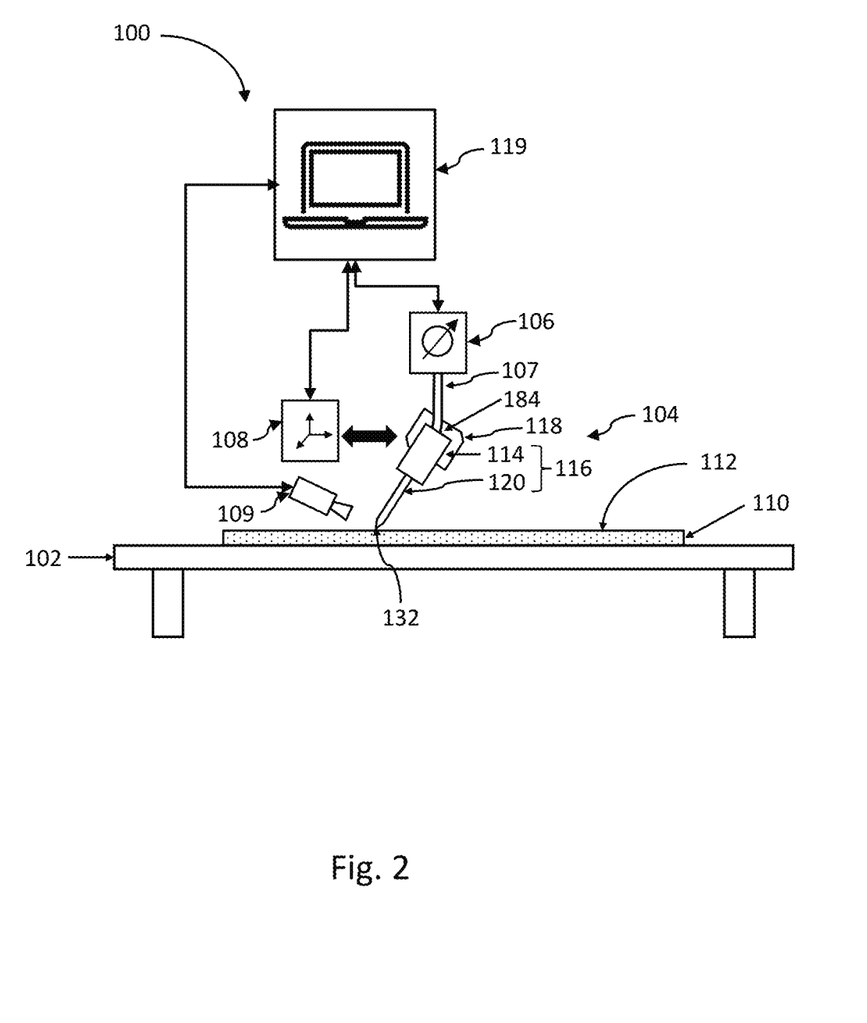
FIG. 2 is a block diagram view of an illustrative printing apparatus, according to one aspect of this disclosure.

FIG. 2 is a block diagram view of an illustrative printing apparatus. The printing apparatus 100 includes a substrate stage 102, a print head 104, a regulated pneumatic system 106, a print head positioning system 108, and a controller 119. The printing apparatus 100 can also include an imaging system 109. The substrate stage 102 supports a substrate 110. The substrate 110 is fixed in position on the substrate stage 102 during the printing (extruding or dispensing) and has a printable surface 112, which is facing upward and facing towards the print head 104. The print head 104 is positioned above the substrate 110. The print head 104 includes a dispenser 116 and a cartridge holder (dispenser holder) 118. The dispenser 116 includes a piston-cylinder assembly 114 and a capillary tube (nozzle) 120, as described with reference to FIG. 5. Typically, the regulated pneumatic system 106 includes a pump and a pressure regulator. In the example shown in FIG. 2, a pneumatic port 184 of the piston cylinder assembly 114 is coupled to the regulated pneumatic system 106 via tubing 107. Preferably, the regulated pneumatic system 106 is capable of applying pressure in a range of 0 to 9 bar to the pneumatic port 184.

Figure 4:
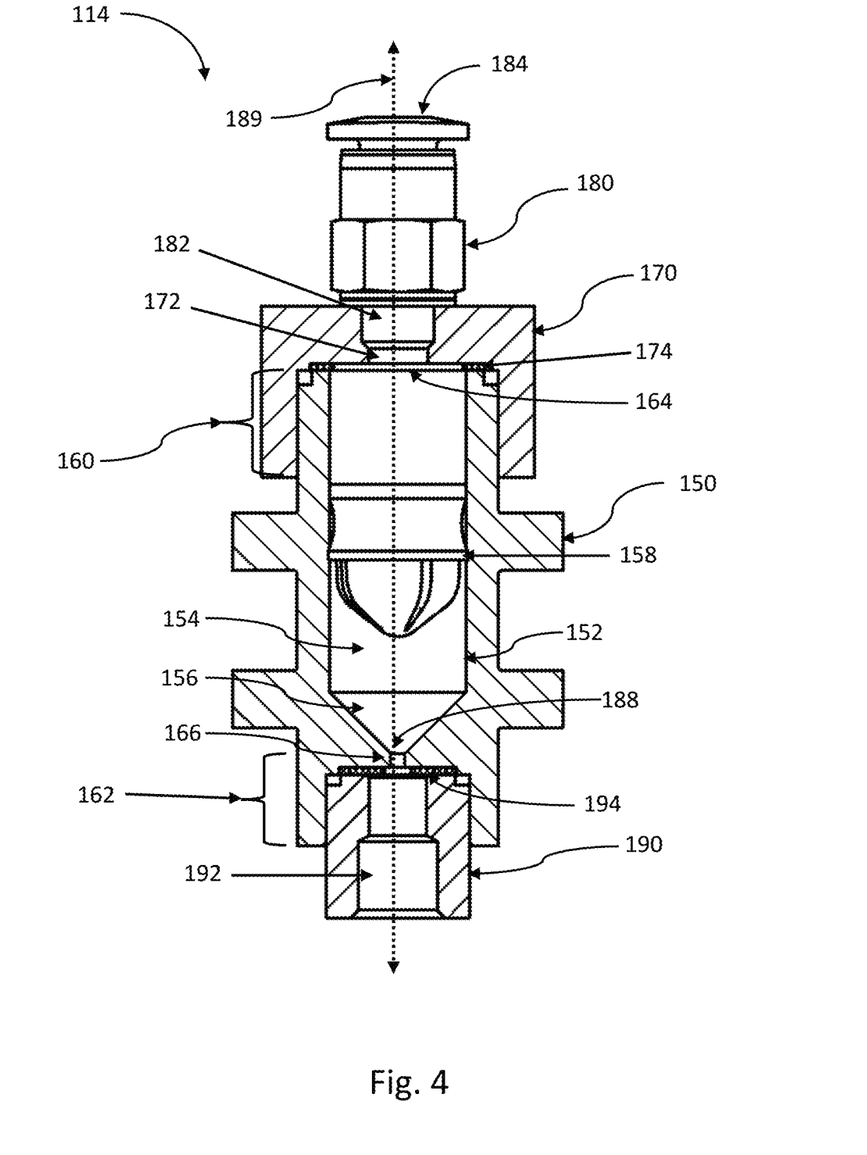
FIG. 4 is a schematic side view and partial cross-sectional view of a piston-cylinder assembly, according to one aspect of this disclosure.

A schematic side view and partial cross-sectional view of an exemplary piston-cylinder assembly 114 is shown in FIG. 4. In the example shown, the piston-cylinder assembly 114 includes a cylinder 150, a cylinder cover 170, a pneumatic connector 180, and an intermediate sealing sleeve 190. The cylinder 150 is shown in cross-section to show a cylindrical cavity portion 154 and a conical cavity portion 156. A piston 158 is located inside cylinder 150. The piston 158 contacts an inner surface 152 of cylinder 150. The cylinder 150 has a first end (top end) portion 160 and a second end (bottom end) portion 162 opposite the first end. The cylinder cover 170 is sealably mated to the cylinder 150 at the first end portion 160. In the example shown, an interior surface of the cylinder cover 170 and an exterior surface of the cylinder 150 at its first end portion 160 form a threaded joint. A flat gasket 174 is under compression between the cylinder cover 170 and the cylinder 150 and forms a seal. The intermediate sealing sleeve 190 is sealably mated to the cylinder 150 at the second end portion 162. In the example shown, an exterior surface of the intermediate sealing sleeve 190 and an interior surface of the cylinder 150 at its second end portion 162 form a threaded joint. A flat gasket 194 is under compression between the intermediate sealing sleeve 190 and the cylinder 150 and forms a seal.

The cylinder cover 170 has an opening 172, which retains the pneumatic connector 180. A pneumatic port 184 extends longitudinally through the pneumatic connector 180. The cylinder 150 has a first end 164, in the first end portion 160, and a second end 166, in the second end portion 162. Accordingly, the pneumatic port is at the first end of the cylinder. Air or fluid enters the cylinder from the pneumatic port 184. Inside the cylinder, air or fluid first travels through the cylindrical cavity portion 154 and then a conical cavity portion 156, which tapers to an outlet port 188 at its apex. The outlet port 188 is at the second end 166 opposite the first end 164. The piston 158 is movable in the cylinder 150 between the first end 164 and the second end 166. The piston 158 and the cylinder 150 are movable relative to each along a common longitudinal axis 189 between a first end and a second end of the cylinder.

In the example discussed herein, the piston is a molded polyethylene part, with a diameter of approximately 9.5 mm, and a length of approximately 10.7 mm. The cylinders are machined aluminum parts with an inner bore diameter of approximately 9.5 mm and inner bore length of 23 mm. Preferably, the piston is more elastic than the cylinder. Preferably, the cylinder includes a metal. For example, the metal can be aluminum or steel. Preferably, the piston includes a plastic. For example, the plastic can be polyethylene or low-density polyethylene.

Figure 5:
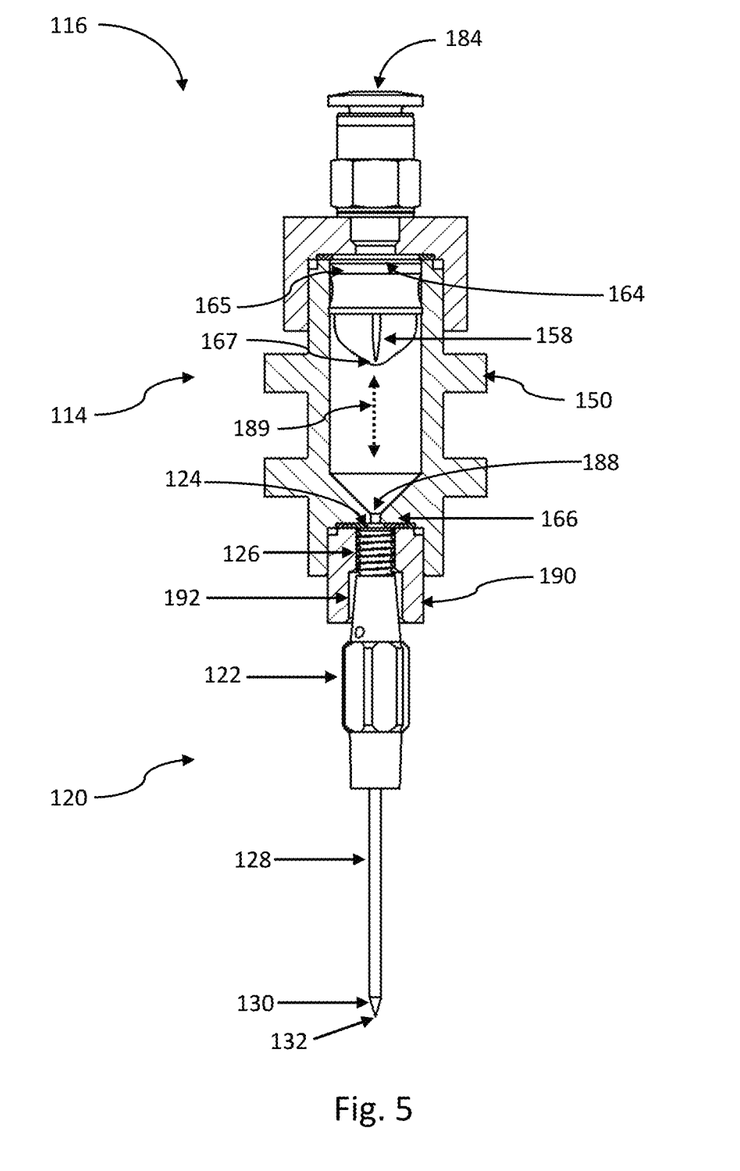
FIG. 5 is a schematic side view and partial cross-sectional view of a dispenser, according to one aspect of this disclosure.

FIG. 5 is a schematic side view and partial cross-sectional view of a dispenser 116. The dispenser 116 includes a piston-cylinder assembly 114 (FIG. 4) and a capillary tube (nozzle) 120. Capillary tube 120 has a tube inlet 124 and a tube outlet 132. Capillary tube 120 is described in greater detail with reference to FIG. 3. In the example shown, there is a handle 122, including a threaded portion 126, attached to the capillary tube. The threaded portion 126 and an interior surface 192 of the intermediate sealing sleeve 190 form a threaded joint. Accordingly, the intermediate sealing sleeve retains the handle that is attached to the capillary tube. The tube inlet 124 of capillary tube 120 is coupled to the outlet port 188 at the second end 166 of the cylinder 150. A capillary tube is installed in the piston-cylinder assembly, to form a dispenser.

Commercially available glass capillary tubes can be used in the dispenser. For example, glass capillary tubes (Eppendorf™ Femtotips™ II Microinjection Capillary Tips), having an inner diameter at the tip of 0.5 µm and an outer diameter at the tip of 0.7 □m, are available from Fisher Scientific. A commercially available glass capillary tube 120 is shown schematically in FIG. 3. The glass capillary tube has an inlet 124 at a first end, and outlet 132 at a second end opposite the first end, and an elongate fluid passageway between the inlet 124 and outlet 132. A plastic handle 122 is attached to the glass capillary tube 120 around its circumference. The plastic handle 122 includes an inlet (input end) 124 and a threaded portion 126 near the inlet 124 which enables a threaded connection to an external body or external conduit (see FIG. 5). The inlet 124 has an inner diameter of 1.2 mm.

Figure 3:
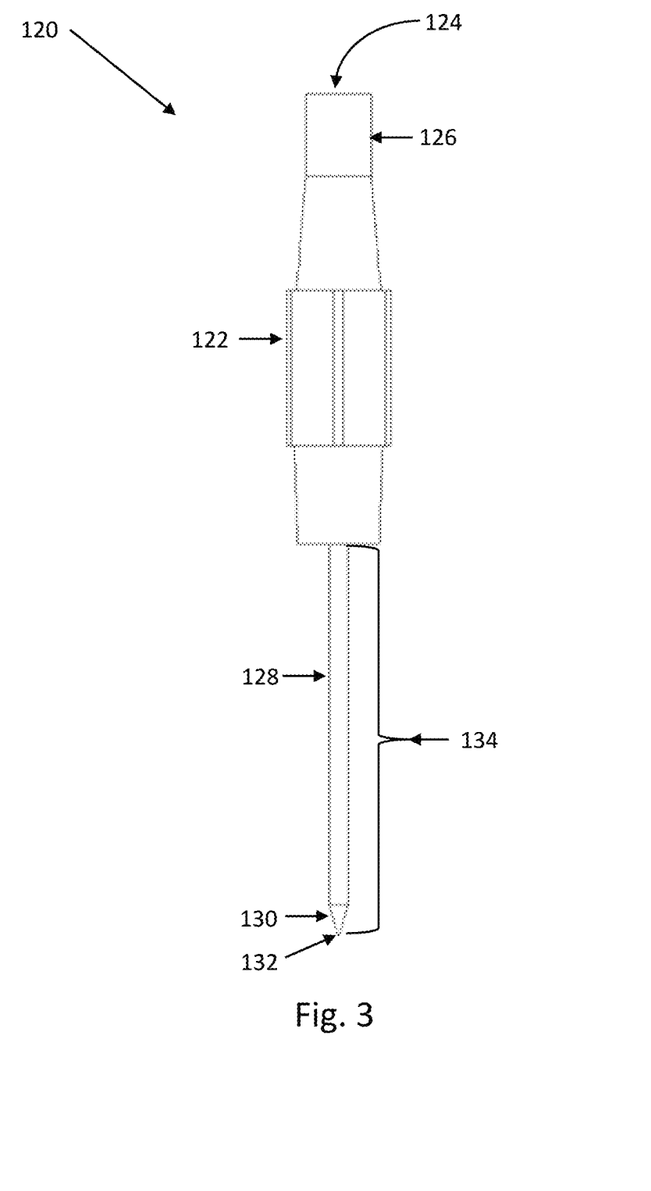
FIG. 3 is a schematic side view of a glass capillary tube, according to one aspect of this disclosure.

The glass capillary tube includes an elongate input portion 128 and a tapering portion 130. There is an externally visible portion 134 of the glass capillary tube 120. Some of the elongate input portion 128 may be obscured by the surrounding plastic handle 122. The tapering portion 130 tapers to an outlet (output end) 132 (having an inner diameter of 0.5 µm and an outer diameter at the tip of 0.7 µm in the case of the certain Femtotips™ II Microinjection Capillary Tips). Stainless-steel capillary tubes can also be used.

In preparing the printing apparatus 100 for use, a composition (e.g., a metallic nanoparticle composition or a polymer solution) is injected into the cylinder 150. In the case of the piston-cylinder assembly shown in FIG. 4, this can be accomplished by injecting the metallic nanoparticle composition into the cylinder 150 via its first end 164 using a syringe, with the piston 158 removed from the cylinder and the cover 170 and the pneumatic connector 180 detached from the cylinder 150. Subsequently, the piston is positioned in the cylinder. In preparing the printing apparatus 100 for use, the cylinder cover 170 and the pneumatic connector 180 are attached to the cylinder 150 (FIG. 4 example). In preparing the printing apparatus 100 for use, the pneumatic port 184 is coupled to a regulated pneumatic system 106 via tubing 107.

Figure 6:
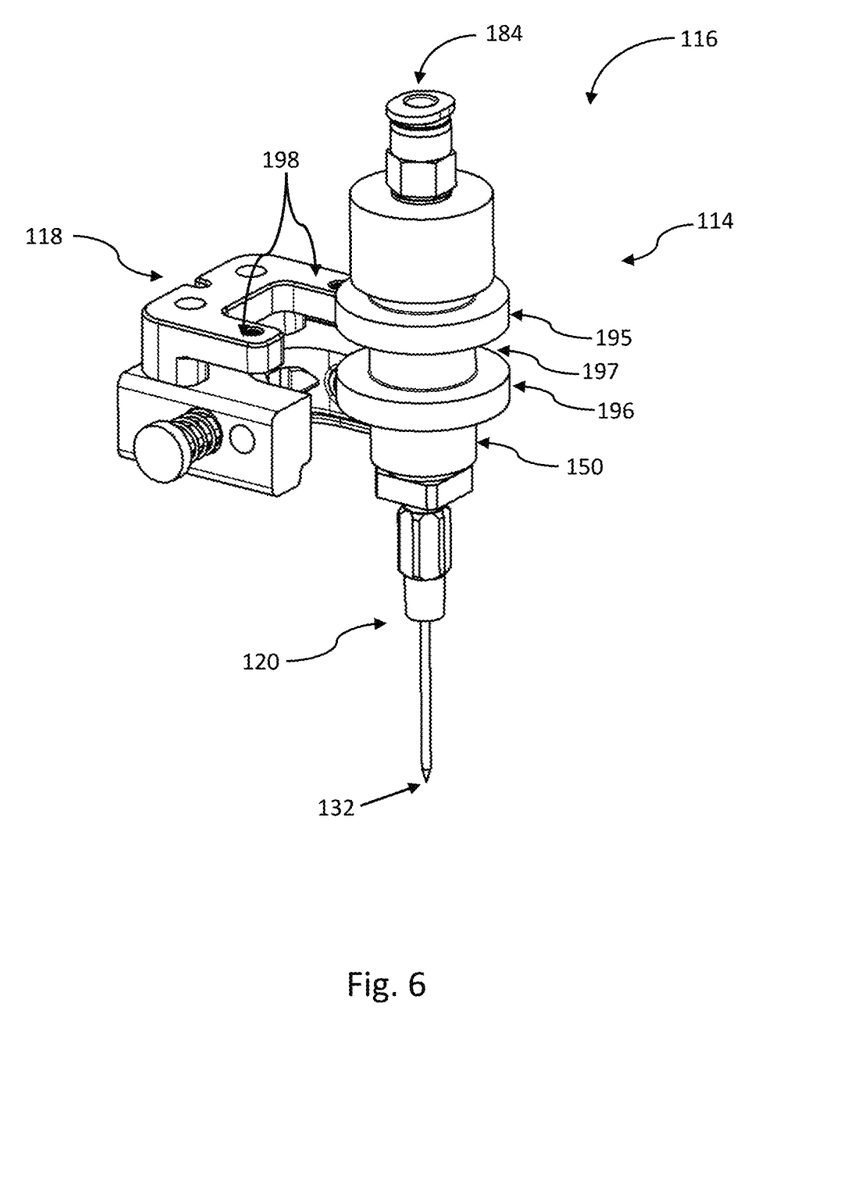
FIG. 6 is a schematic perspective view of a dispenser and an associated dispenser holder, according to one aspect of this disclosure.

FIG. 6 is a schematic perspective view of a dispenser 116 and an associated dispenser holder 118. The dispenser holder 118 includes a fork 198. When assembled, the fork is inserted into a groove 197 between two annular protrusions 195, 196 that protrude radially outward from the outer walls of the cylinder 150. Accordingly, the dispenser holder 118 retains the dispenser. The dispenser holder 118 is mechanically coupled to the print head positioning system 108. In preparing the printing apparatus 100 for use, the dispenser 116 is installed in the dispenser holder 118.

As shown in FIG. 2, the imaging system 109 captures images of the capillary tube outlet 132 and a portion of the substrate's printable surface 112 near the capillary tube outlet 132. The imaging system 109 is used to monitor a vertical distance (height) between the capillary tube outlet 132 and a surface on which the metallic nanoparticle composition is dispensed, such as the printable surface 112 of the substrate 110. The print head positioning system 108 is configured to vertically position and laterally position the print head (e.g., the outlet of the capillary tube) relative to the substrate. The print head positioning system 108 controls the vertical displacement of the print head 104 and the lateral displacement of the print head 104 relative to the substrate. In extruding (dispensing) a composition, regulated pressure is applied to a piston in the piston-cylinder assembly. The extrusion relies solely on the applied pressure; the extruding (dispensing) is carried out without the application of electric fields to the composition.

Printing apparatus 100 preferably includes a controller 119 (FIG. 2). For example, controller 119 includes a computer with the hardware and software necessary for communicating with and controlling the imaging system 109, the print head positioning system 108, and the pneumatic system 106. Preferably, the controller determines, using image data from the imaging system 109, a current vertical distance between the nozzle outlet and the surface (the surface on which the composition is being dispensed). In accordance with the current vertical distance, the controller 119 controls the print head positioning system 108 to maintain a vertical distance within a desired range.

Figure 7:
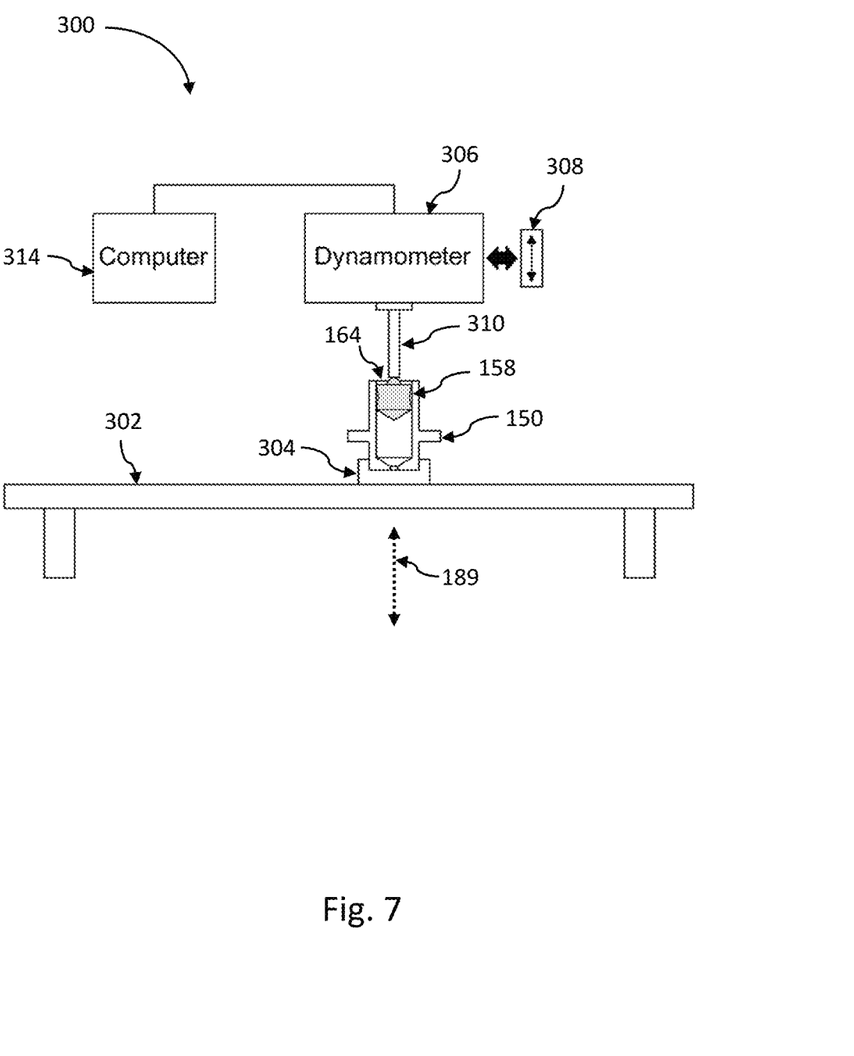
FIG. 7 is a schematic block diagram view of an illustrative inspection apparatus (apparatus for detecting surface irregularities on or in an internal surface of a cylinder for use in a piston-cylinder assembly), according to one aspect of this disclosure.

FIG. 1 is a flow diagram of a method 10 of detecting surface irregularities on or in an internal surface of a cylinder for use in a piston-cylinder assembly. The method can be conducted using an inspection apparatus as shown in FIG. 7. FIG. 7 is a schematic block diagram view of an inspection apparatus 300. Apparatus 300 includes a component support structure 304, a dynamometer 306, a positioner 308, and a controller 314. The component support structure 304 is fixed in position and orientation on a table 302. The component support structure 304 is configured to fix a position of and orientation of cylinder 150. In the example shown, the input end (first end 164) of the cylinder 150, through which the piston 158 is inserted, is pointing upward. The positioner 308 is attached to the dynamometer 306 and is configured to move the dynamometer 306 and the piston 158 along the common longitudinal axis 189 between a first position and a second position. FIG. 7 shows the piston 158 located near the input end of the cylinder. For example, at the first position, the piston is at a first end of the cylinder and at the second position, the piston is at a second end of the cylinder. At both the first position and the second position, the piston 158 is located inside the cylinder 150.

The dynamometer 306 is mechanically coupled to the piston 158. This does not require that the dynamometer 306 be attached to the piston. In the example shown, there is an extension rod 310 suspended above the piston 158. The positioner 308 is attached to the dynamometer and is configured to move the dynamometer 306 along the longitudinal axis 189. Accordingly, when the dynamometer moves, the extension rod 310 pushes the piston downward along the longitudinal axis 189 from the first position to the second position. In another possible configuration, the component support structure 304 is configured to fix a position of and orientation of piston 158, the positioner 308 is configured to move the dynamometer 306 and the cylinder 150, and the dynamometer 308 is mechanically coupled to the cylinder 150.

The dynamometer 308 is configured to measure a frictional force between the cylinder 150 and the piston 158 during the movement along the common longitudinal axis 189. Preferably, the movement occurs at a steady-state speed in a range of 1 to 4 mm/sec. The controller 314 can be a computer, for example. The controller 314 is electronically coupled to the dynamometer 306 via a wired or wireless connection. The controller 314 is configured to detect surface irregularities on or in the internal surface of the cylinder in accordance with temporal changes in the frictional force.

Method 10 (FIG. 1) of detecting surface irregularities on or in an internal surface of a cylinder for use in a piston-cylinder assembly includes steps 12, 14, 16, 18, and 20. Consider the configuration shown in FIG. 7 in which the cylinder 150 is held fixed by the component support structure 304 and the piston 158 moves inside the cylinder 150 along the common longitudinal axis 189. At step 12, a position and orientation of the cylinder 150 are fixed. At step 14, the positioner 308 and the dynamometer 306 are configured to move the dynamometer 306 and the piston 158 along the common longitudinal axis. The dynamometer 306 is mechanically coupled to the piston 158.

At step 16, the piston 158 is moved relative to the cylinder 150 along the common longitudinal axis between a first position and a second position. The piston 158 is located inside the cylinder 150 at the first position and the second position. For example, at the first position, the piston 158 is at a first end of the cylinder 150 and at the second position, the piston 158 is at a second end of the cylinder 150. In the alternative configuration, the roles of the piston 158 and the cylinder 150 are reversed at steps 12, 14, and 16. At step 12, a position and orientation of the piston 158 are fixed. At step 14, the positioner 308 and the dynamometer 306 are configured, to move the dynamometer 306 and the cylinder 150 along the common longitudinal axis. The dynamometer 306 is mechanically coupled to the cylinder 150. At step 16, the cylinder 150 is moved relative to the piston 158 along the common longitudinal axis between a first position and a second position.

At step 18, the dynamometer 306 measures a frictional force between the piston 158 and the cylinder 150 during the movement. At step 20, surface irregularities on or in the internal surface of the cylinder are detected in accordance with temporal changes in the frictional force during the movement. In the example shown in FIG. 7, the determining is done by the controller 314.

Figure 8:
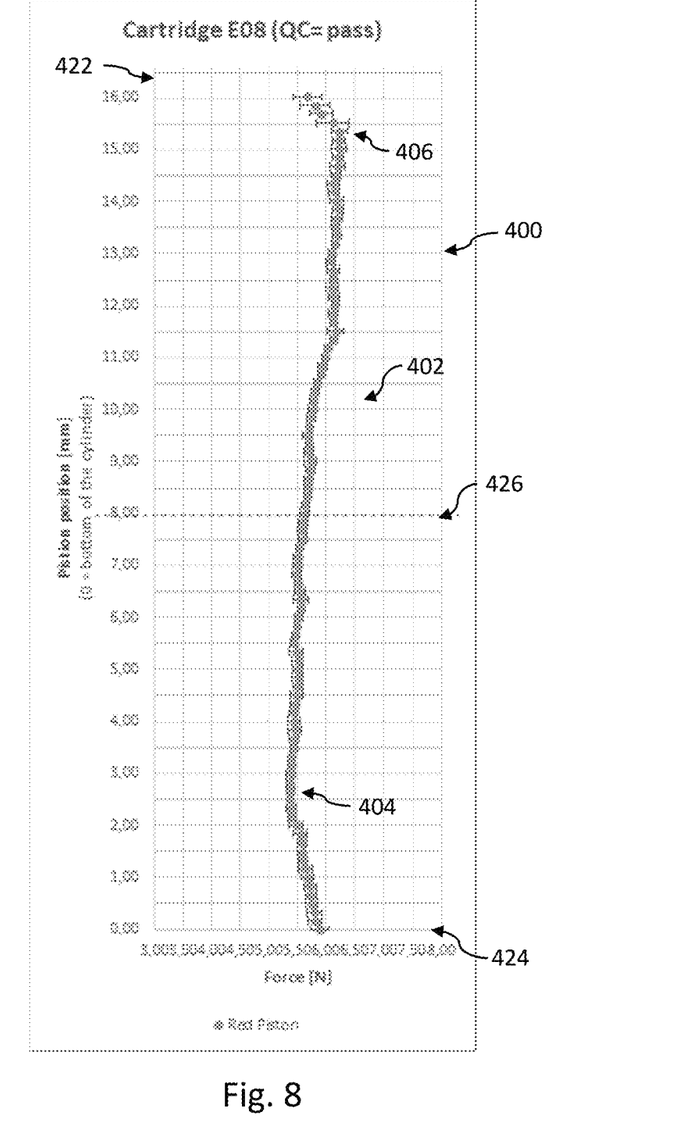
FIG. 8 is a graphical plot showing dependence of frictional force on position of a piston relative to a cylinder, wherein the cylinder is satisfactory (cylinder's internal surface does not have detectable surface irregularities), according to one aspect of this disclosure.
Figure 9:
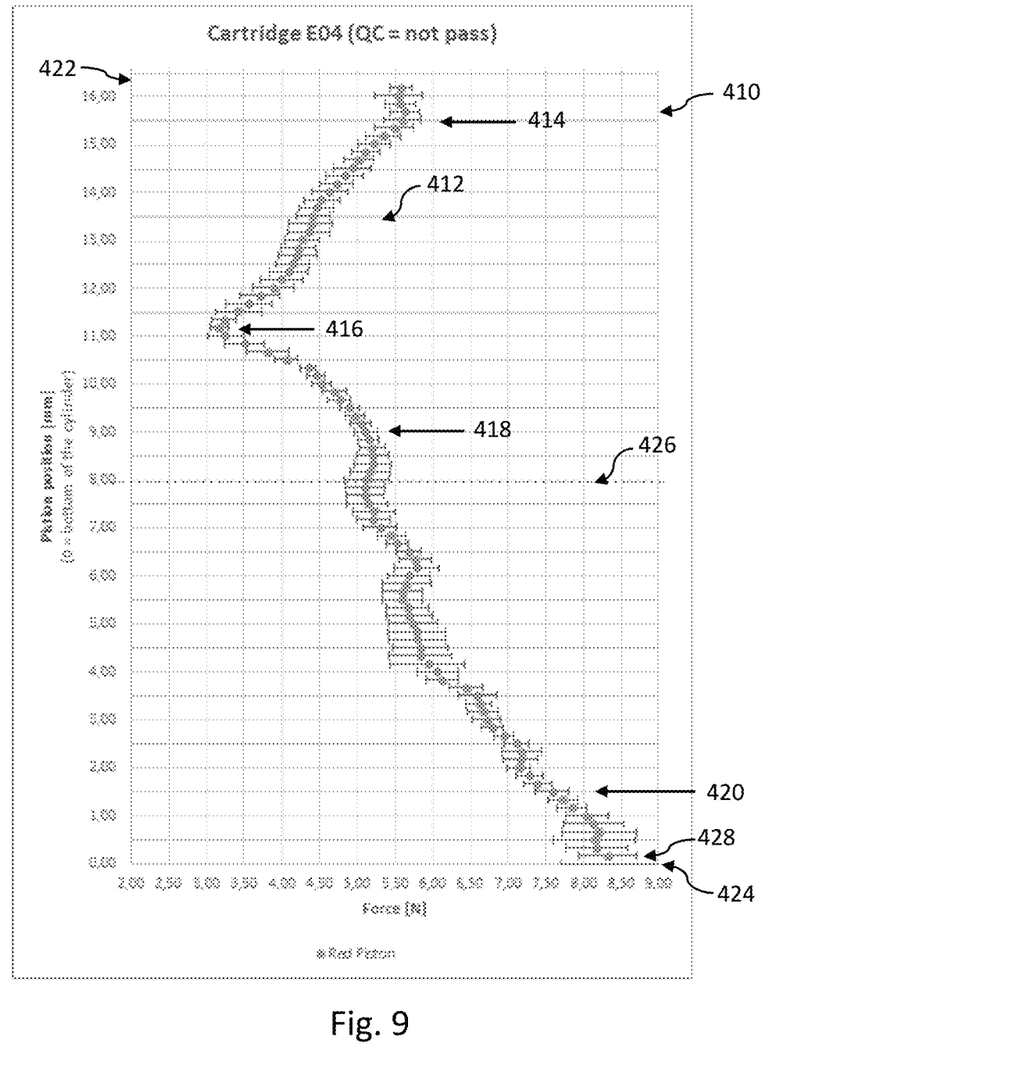
FIG. 9 is a graphical plot showing dependence of frictional force on position of a piston relative to a cylinder, wherein the cylinder is not satisfactory (cylinder's internal surface has detectable surface irregularities), according to one aspect of this disclosure.

FIGS. 8 and 9 are graphical plots (400, 410) showing dependence of measured frictional force on position of a piston relative to a cylinder. FIG. 8 shows frictional force data points 402 measured on a cylinder for which surface irregularities on or in its internal surface were not detected. FIG. 9 shows frictional force data points 412 measured on a cylinder for which surface irregularities on or in its internal surface were detected. Each of the graphical plots 400, 410 has a vertical axis 422 showing position of piston 158 relative to the cylinder 150 ranging between a first position at 16 mm, near the top of the cylinder, and a second position at 0 mm, near the bottom of the cylinder. For reference, a dotted line 426 indicates a typical position in the cylinder to which a nanoparticle composition is filled. This typical position is at 8 mm. Each of the graphical plots 400, 410 has a horizontal axis 424 showing measured frictional force expressed in Newtons.

In the case of FIG. 8 (no surface irregularities detected), the frictional force data ranged between 5.3 and 6.2 N. In the case of FIG. 9 (surface irregularities detected), the frictional force data ranged between 3.0 and 8.5 N. The FIG. 9 cylinder exhibits variation of the inner bore diameter. Approximate inner bore diameters were measured using a bore gauge. Approximate inner bore diameters, approximate frictional forces, and approximate piston positions for three selected data points are tabulated in Table 1 below.

TABLE 1

| Data point No. | Approximate piston position (mm) | Approximate frictional force (N) | Approximate inner bore diameter (mm) |
| --- | --- | --- | --- |
| 414 | 15.5 | 5.6 | 9.587 |
| 418 | 9.0 | 5.1 | 9.590 |
| 420 | 1.5 | 7.6 | 9.569 |

A general correlation between the frictional force and the inner bore diameter can be deduced: a larger frictional force indicates a smaller inner bore diameter, and a smaller frictional force indicates a larger inner bore diameter. From the above inner bore data (Table 1), there is a variation in inner bore diameter of at least 0.021 mm. Additionally, frictional force at data point 416 is approximately 3.25 N, less than at data point 418 (5.1 N). Accordingly, the inner bore diameter at data point 416 is expected to be greater than at data point 418. Taking data point 416 into account, we estimate the variation in inner bore diameter to be at least 0.03 mm. Such variation of the inner bore diameter is an example of a failure of the inner bore manufacturing process. For example, this failure may be caused by vibrations of the tip of the boring tool or improper settings of the boring parameters. Upon discovery of the inner bore diameter variation, it may be possible to reduce or eliminate the inner bore diameter variation by carrying out additional polishing of the inner surface. The inner bore diameter variation determined from FIG. 9 is an example of a surface irregularity on or in the internal surface 152 of the cylinder 150.

An indentation is an example of a surface irregularity in the internal surface 152. A protrusion is an example of a surface irregularity on the internal surface 152.

Surface irregularities on or in the internal surface of the cylinder are detected in accordance with temporal changes in the frictional force during the movement of the piston and the cylinder relative to each other. Temporal changes in the frictional force are indicated by changes in the frictional force as a function of relative position between the piston and the cylinder. The frictional force data points 402 of FIG. 8 (no surface irregularities detected) are characterized by changes of frictional force during the movement in a range of 0.01 N/mm to 0.4 N/mm. For example, these changes can be calculated between data points that are separated from each other by 1.0 mm. The frictional force data points 412 of FIG. 9 (surface irregularities detected) are characterized by changes of frictional force in a range of 0.3 N/mm to 1.3 N/mm. Typically, changes of the frictional force during the movement of 0.5 N/mm or greater indicate the presence of surface irregularities on or in the internal surface.

In FIG. 8, the frictional force data points 402 vary between a global maximum of the frictional force (point 406) and a global minimum of the frictional force (point 404). The frictional force at the global maximum (406) is approximately 6.2 N and the frictional force at the global minimum (404) is approximately 5.4 N. In the example shown in FIG. 8, a difference between a global maximum of the frictional force and a global minimum of the frictional force during the movement is approximately 0.8 N.

In FIG. 9, the frictional force data points 412 vary between a global maximum of the frictional force (point 428) and a global minimum of the frictional force (point 416). The frictional force at the global maximum (428) is approximately 8.4 N and the frictional force at the global minimum (416) is approximately 3.25 N. In the example shown in FIG. 9, a difference between a global maximum of the frictional force and a global minimum of the frictional force during the movement is approximately 5.15 N. Typically, a difference between a global maximum of the frictional force and a global minimum of the frictional force during the movement being at least 1.5 N indicates the presence of surface irregularities on or in the internal surface.

Step 20 of method 10 (FIG. 1) includes detecting surface irregularities on or in the internal surface of the cylinder in accordance with temporal changes in the frictional force during the movement of the cylinder and/or the piston relative to each other. The temporal changes are large enough to indicate the presence of surface irregularities. Preferably, the temporal changes include one or more of the following: (1) a change of the frictional force during the movement of 0.5 N/mm or greater; and (2) a difference between a global maximum of the frictional force and a global minimum of the frictional force during the movement being at least 1.5 N. If either condition (1) or (2) is satisfied, surface irregularities are detected. FIG. 8 is an example in which neither condition is satisfied; hence no surface irregularities are detected. FIG. 9 is an example in which both conditions are satisfied; hence surface irregularities are detected.

Various aspects of the devices, systems, and methods described herein are set out in the following clauses.

Clause 1: A method of detecting surface irregularities on or in an internal surface of a cylinder for use in a piston-cylinder assembly, comprising: (A) fixing a position of and orientation of a first one of the cylinder and a piston; (B) configuring a positioner and a dynamometer to move the dynamometer and a second one of the cylinder and the piston along a common longitudinal axis, the dynamometer being mechanically coupled to the second one; (C) moving the second one relative to the first one along the common longitudinal axis between a first position and a second position, the piston being located inside the cylinder at the first position and at the second position; (D) measuring, by the dynamometer, a frictional force between the piston and the cylinder during the movement; and (E) detecting surface irregularities on or in the internal surface of the cylinder in accordance with temporal changes in the frictional force during the movement.

Clause 2: The method of Clause 1, wherein at the first position, the piston is at a first end of the cylinder and at the second position, the piston is at a second end of the cylinder.

Clause 3: The method of any of Clauses 1-2, wherein the first one is the cylinder and the second one is the piston.

Clause 4: The method of any of Clauses 1-3, wherein the piston is more elastic than the cylinder.

Clause 5: The method of any of Clauses 1-4, wherein the cylinder comprises metal.

Clause 6: The method of any of Clauses 1-5, wherein the metal is selected from aluminum and steel.

Clause 7: The method of any of Clauses 1-6, wherein the piston comprises a plastic.

Clause 8: The method of any of Clauses 1-7, wherein the plastic is selected from polyethylene and low-density polyethylene.

Clause 9: The method of any of Clauses 1-8, wherein the movement is at a steady-state speed in a range of 1 to 4 mm/sec.

Clause 10: The method of any of Clauses 1-9, wherein an average of the frictional force is in a range of 0.5 to 8 N.

Clause 11: The method of any of Clauses 1-10, wherein the temporal changes comprise a change of the frictional force during the movement of 0.5 N/mm or greater.

Clause 12: The method of any of Clauses 1-11, wherein the temporal changes comprise a difference between a global maximum of the frictional force and a global minimum of the frictional force during the movement being at least 1.5 N.

Clause 13: An apparatus for detecting surface irregularities on or in an internal surface of a cylinder for use in a piston-cylinder assembly, comprising: a component support structure configured to fix a position of and orientation of a first one of the cylinder and a piston; a dynamometer; a positioner attached to the dynamometer and configured to move the dynamometer and a second one of the cylinder and the piston along a common longitudinal axis between a first position and a second position, the piston being located inside the cylinder at the first position and at the second position, the dynamometer being mechanically coupled to the second one, the dynamometer being configured to measure a frictional force between the cylinder and the piston during the movement; and a controller electronically coupled to the dynamometer, configured to detect surface irregularities on or in the internal surface of the cylinder in accordance with temporal changes in the frictional force during the movement.

Clause 14: The apparatus of Clause 13, wherein at the first position, the piston is at a first end of the cylinder and at the second position, the piston is at a second end of the cylinder.

Clause 15: The apparatus of any of Clauses 13-14, wherein the first one is the cylinder and the second one is the piston.

Clause 16: The apparatus of any of Clauses 13-15, wherein the movement is at a steady-state speed in a range of 1 to 4 mm/sec.

Clause 17: The apparatus of any of Clauses 13-16, wherein an average of the frictional force is in a range of 0.5 to 8 N.

Clause 18: The apparatus of any of Clauses 13-17, wherein the temporal changes comprise a change in the frictional force during the movement of 0.5 N/mm or greater.

Clause 19: The apparatus of any of Clauses 13-18, wherein the temporal changes comprise a difference between a global maximum of the frictional force and a global minimum of the frictional force during the movement being at least 1.5 N.

What is claimed is:

1. A method of detecting surface irregularities on or in an internal surface of a cylinder for use in a piston-cylinder assembly, comprising:
   (A) fixing a position of and an orientation of a first one selected from the group consisting of the cylinder and a piston;
   (B) configuring a positioner and a dynamometer to move the dynamometer and a second one selected from the group consisting of the cylinder and the piston, along a common longitudinal axis, the dynamometer being mechanically coupled to the second one, wherein the first one and the second one are different;
   (C) performing a movement comprising moving the second one relative to the first one along the common longitudinal axis between a first position and a second position, the piston being located inside the cylinder at the first position and at the second position;
   (D) measuring, by the dynamometer, a frictional force between the piston and the cylinder during the movement; and
   (E) detecting surface irregularities on or in the internal surface of the cylinder in accordance with temporal changes in the frictional force during the movement.

2. The method of claim 1, wherein at the first position, the piston is at a first end of the cylinder and at the second position, the piston is at a second end of the cylinder.

3. The method of claim 1, wherein the first one is the cylinder and the second one is the piston.

4. The method of claim 1, wherein the piston is more elastic than the cylinder.

5. The method of claim 1, wherein the cylinder comprises metal.

6. The method of claim 5, wherein the metal is selected from aluminum and steel.

7. The method of claim 1, wherein the piston comprises a plastic.

8. The method of claim 7, wherein the plastic is selected from polyethylene and low-density polyethylene.

9. The method of claim 1, wherein the movement is at a steady-state speed in a range of 1 to 4 mm/sec.

10. The method of claim 1, wherein an average of the frictional force is in a range of 0.5 to 8 N.

11. The method of claim 1, wherein the temporal changes comprise a change of the frictional force during the movement of 0.5 N/mm or greater.

12. The method of claim 1, wherein the temporal changes comprise a difference between a global maximum of the frictional force and a global minimum of the frictional force during the movement being at least 1.5 N.

13. An apparatus for detecting surface irregularities on or in an internal surface of a cylinder for use in a piston-cylinder assembly, comprising:
- a component support structure configured to fix a position of and an orientation of a first one selected from the group consisting of the cylinder and a piston;
- a dynamometer;
- a positioner attached to the dynamometer and configured to perform a movement comprising the positioner configured to move the dynamometer and a second one selected from the group consisting of the cylinder and the piston along a common longitudinal axis between a first position and a second position, the piston being located inside the cylinder at the first position and at the second position, the dynamometer being mechanically coupled to the second one, the dynamometer being configured to measure a frictional force between the cylinder and the piston during the movement, wherein the first one and the second one are different; and
- a controller electronically coupled to the dynamometer, configured to detect surface irregularities on or in the internal surface of the cylinder in accordance with temporal changes in the frictional force during the movement.

14. The apparatus of claim 13, wherein at the first position, the piston is at a first end of the cylinder and at the second position, the piston is at a second end of the cylinder.

15. The apparatus of claim 13, wherein the first one is the cylinder and the second one is the piston.

16. The apparatus of claim 13, wherein the movement is at a steady-state speed in a range of 1 to 4 mm/sec.

17. The apparatus of claim 13, wherein an average of the frictional force is in a range of 0.5 to 8 N.

18. The apparatus of claim 13, wherein the temporal changes comprise a change in the frictional force during the movement of 0.5 N/mm or greater.

19. The apparatus of claim 13, wherein the temporal changes comprise a difference between a global maximum of the frictional force and a global minimum of the frictional force during the movement being at least 1.5 N.

20. The method of claim 1, wherein measuring, by the dynamometer, the frictional force between the piston and the cylinder during the movement comprising measuring frictional force as a function of relative position between the piston and the cylinder.

* * * * *